US010791518B2

(12) United States Patent
Zhang et al.

(10) Patent No.: US 10,791,518 B2
(45) Date of Patent: Sep. 29, 2020

(54) DISCONTINUOUS RECEPTION (DRX) OPERATIONS WITH FLEXIBLE SCHEDULING OF DATA COMMUNICATIONS

(71) Applicant: QUALCOMM Incorporated, San Diego, CA (US)

(72) Inventors: Xiaoxia Zhang, San Diego, CA (US); Jing Sun, San Diego, CA (US); Ozcan Ozturk, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/298,846

(22) Filed: Mar. 11, 2019

(65) Prior Publication Data

US 2019/0313331 A1 Oct. 10, 2019

Related U.S. Application Data

(60) Provisional application No. 62/653,162, filed on Apr. 5, 2018.

(51) Int. Cl.
*H04W 52/02* (2009.01)
*H04W 76/28* (2018.01)
(Continued)

(52) U.S. Cl.
CPC ... *H04W 52/0225* (2013.01); *H04W 52/0216* (2013.01); *H04W 72/1289* (2013.01);
(Continued)

(58) Field of Classification Search
CPC ......... H04W 52/0216; H04W 52/0225; H04W 72/1289; H04W 76/27; H04W 76/28; H04W 76/38
See application file for complete search history.

(56) References Cited

U.S. PATENT DOCUMENTS

2018/0020382 A1 1/2018 Kim et al.
2018/0213594 A1* 7/2018 You ..................... H04W 72/085
(Continued)

FOREIGN PATENT DOCUMENTS

EP 3226456 A1 10/2017

OTHER PUBLICATIONS

International Search Report and Written Opinion—PCT/US2019/021873—ISA/EPO—dated May 10, 2019.

*Primary Examiner* — Gbemileke J Onamuti
(74) *Attorney, Agent, or Firm* — Harrity & Harrity, LLP

(57) ABSTRACT

Some techniques and apparatuses described herein permit a user equipment (UE) to start a discontinuous reception (DRX) inactivity timer based at least in part on a data communication (e.g., a slot in which a downlink data communication and/or an uplink data communication is scheduled), rather than starting the DRX inactivity timer in a slot in which a corresponding downlink control channel communication is received. In this way, the UE may increase the duration of time that the UE is in a sleep state, especially when the data communication is scheduled to occur with a long delay after the downlink control channel communication, thereby conserving battery power of the UE. Some of these techniques and apparatuses may be flexibly configured to conserve battery power of the UE depending on a flexible scheduling of data communications.

30 Claims, 12 Drawing Sheets

(51) Int. Cl.
*H04W 76/38* (2018.01)
*H04W 76/27* (2018.01)
*H04W 72/12* (2009.01)

(52) U.S. Cl.
CPC .......... *H04W 76/27* (2018.02); *H04W 76/28* (2018.02); *H04W 76/38* (2018.02)

(56) References Cited

U.S. PATENT DOCUMENTS

2018/0375623 A1\* 12/2018 Suzuki .................. H04L 1/1883
2019/0081743 A1\* 3/2019 Loehr ............... H04W 72/1289

\* cited by examiner

DISCONTINUOUS RECEPTION (DRX) OPERATIONS WITH FLEXIBLE SCHEDULING OF DATA COMMUNICATIONS

CROSS-REFERENCE TO RELATED APPLICATIONS UNDER 35 U.S.C. § 119

This application claims priority to U.S. Provisional Patent Application No. 62/653,162, filed on Apr. 5, 2018, entitled "TECHNIQUES AND APPARATUSES FOR DISCONTINUOUS RECEPTION (DRX) OPERATIONS WITH FLEXIBLE SCHEDULING OF DATA COMMUNICATIONS," which is hereby expressly incorporated by reference herein.

BACKGROUND

Field

Aspects of the present disclosure generally relate to wireless communication, and more particularly to techniques and apparatuses for discontinuous reception (DRX) operations with flexible scheduling of data communications.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipments (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

In 5G radio access technologies, the timing between a downlink control channel communication and a corresponding data communication may be flexibly configured. For example, a timing between the downlink control channel communication and reception of a corresponding downlink data communication, scheduled by the downlink control channel communication, may be configured as 0 slots (e.g., a same slot), 1 slot, 2 slots, 3 slots, 4 slots, 5 slots, 8 slots, 10 slots, 16 slots, 20 slots, 32 slots, and/or the like. Similarly, a timing between the downlink control channel communication and transmission of a corresponding uplink data communication, scheduled by the downlink control channel communication, may be configured as 0 slots (e.g., a same slot), 1 slot, 2 slots, 3 slots, 4 slots, 5 slots, 6 slots, 7 slots, 8 slots, 10 slots, 16 slots, 20 slots, 32 slots, and/or the like. In this case, a UE may unnecessarily remain in an active state of a discontinuous reception (DRX) cycle if a DRX inactivity timer starts upon reception of the downlink control channel communication, especially if the corresponding data communication does not occur before expiration of the DRX inactivity timer. This may waste battery power of the UE.

Some techniques and apparatuses described herein permit a UE to start a DRX inactivity timer based at least in part on a data communication (e.g., a slot in which a downlink data communication and/or an uplink data communication is scheduled), rather than starting the DRX inactivity timer in a slot in which a corresponding downlink control channel communication is received. In this way, the UE may increase the duration of time that the UE is in a sleep state, especially when the data communication is scheduled to occur with a long delay after the downlink control channel communication, thereby conserving battery power of the UE. Some of these techniques and apparatuses may be flexibly configured to conserve battery power of the UE depending on a flexible scheduling of data communications.

In an aspect of the disclosure, a method, a user equipment (UE), an apparatus, and a computer program product are provided.

In some aspects, the method may be performed by a UE. The method may include receiving a downlink control channel communication in a first slot during a discontinuous reception (DRX) on duration; and starting a DRX inactivity timer in a second slot, wherein the second slot is indicated by the downlink control channel communication.

In some aspects, the UE may include a memory and one or more processors operatively coupled to the memory. The memory and the one or more processors may be configured to receive a downlink control channel communication in a first slot during a DRX on duration; and start a DRX inactivity timer in a second slot, wherein the second slot is indicated by the downlink control channel communication.

In some aspects, the apparatus may include means for receiving a downlink control channel communication in a first slot during a DRX on duration; and means for starting a DRX inactivity timer in a second slot, wherein the second slot is indicated by the downlink control channel communication.

In some aspects, the computer program product may include a non-transitory computer-readable medium storing one or more instructions. The one or more instructions, when executed by one or more processors of a UE, may cause the one or more processors to receive a downlink control channel communication in a first slot during a DRX on duration; and start a DRX inactivity timer in a second slot, wherein the second slot is indicated by the downlink control channel communication.

In some aspects, the method may be performed by a UE. The method may include receiving a downlink control channel communication in a first slot during a discontinuous reception (DRX) on duration; determining a second slot for starting a DRX inactivity timer, wherein the second slot occurs after the first slot; and starting the DRX inactivity timer in the second slot.

In some aspects, the UE may include a memory and one or more processors operatively coupled to the memory. The memory and the one or more processors may be configured to receive a downlink control channel communication in a first slot during a discontinuous reception (DRX) on duration; determine a second slot for starting a DRX inactivity timer, wherein the second slot occurs after the first slot; and start the DRX inactivity timer in the second slot.

In some aspects, the apparatus may include means for receiving a downlink control channel communication in a first slot during a discontinuous reception (DRX) on duration; means for determining a second slot for starting a DRX inactivity timer, wherein the second slot occurs after the first slot; and means for starting the DRX inactivity timer in the second slot.

In some aspects, the computer program product may include a non-transitory computer-readable medium storing one or more instructions. The one or more instructions, when executed by one or more processors of a UE, may cause the one or more processors to receive a downlink control channel communication in a first slot during a discontinuous reception (DRX) on duration; determine a second slot for starting a DRX inactivity timer, wherein the second slot occurs after the first slot; and start the DRX inactivity timer in the second slot.

In some aspects, the method may be performed by a UE. The method may include receiving a downlink control channel communication in a first slot during a discontinuous reception (DRX) on duration; determining a second slot for expiration of a DRX inactivity timer, wherein the second slot is determined based at least in part on a data channel communication scheduled by the downlink control channel communication; and starting the DRX inactivity timer in the first slot, wherein the UE is configured to remain in an active state from the first slot to the second slot.

In some aspects, the UE may include a memory and one or more processors operatively coupled to the memory. The memory and the one or more processors may be configured to receive a downlink control channel communication in a first slot during a discontinuous reception (DRX) on duration; determine a second slot for expiration of a DRX inactivity timer, wherein the second slot is determined based at least in part on a data channel communication scheduled by the downlink control channel communication; and start the DRX inactivity timer in the first slot, wherein the UE is configured to remain in an active state from the first slot to the second slot.

In some aspects, the apparatus may include means for receiving a downlink control channel communication in a first slot during a discontinuous reception (DRX) on duration; means for determining a second slot for expiration of a DRX inactivity timer, wherein the second slot is determined based at least in part on a data channel communication scheduled by the downlink control channel communication; and means for starting the DRX inactivity timer in the first slot, wherein the apparatus is configured to remain in an active state from the first slot to the second slot.

In some aspects, the computer program product may include a non-transitory computer-readable medium storing one or more instructions. The one or more instructions, when executed by one or more processors of a UE, may cause the one or more processors to receive a downlink control channel communication in a first slot during a discontinuous reception (DRX) on duration; determine a second slot for expiration of a DRX inactivity timer, wherein the second slot is determined based at least in part on a data channel communication scheduled by the downlink control channel communication; and start the DRX inactivity timer in the first slot, wherein the UE is configured to remain in an active state from the first slot to the second slot.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
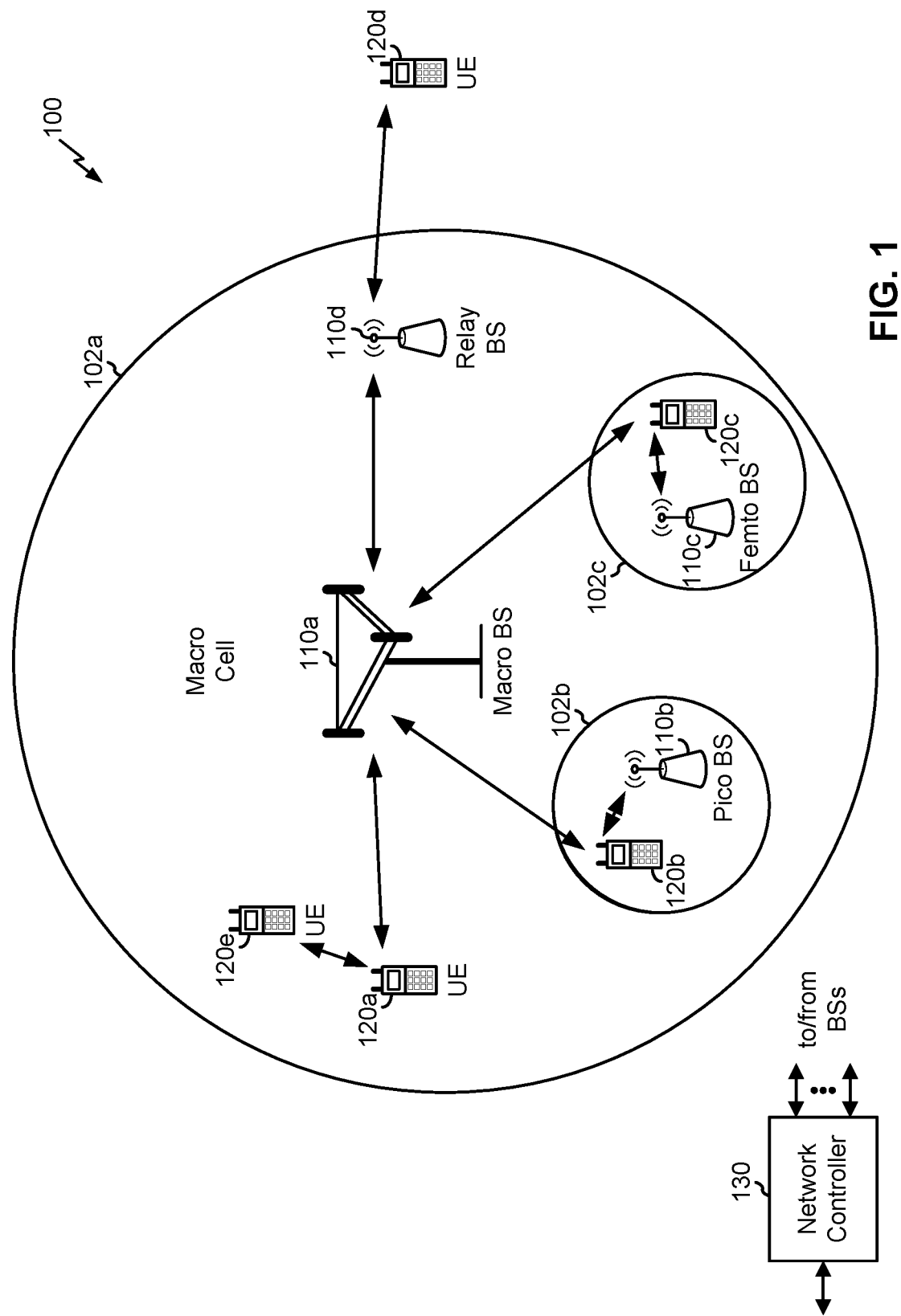
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatuses and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented by a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It is noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a network 100 in which aspects of the present disclosure may be practiced. The network 100 may be an LTE network or some other wireless network, such as a 5G network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. A UE 120 may operate using a discontinuous reception (DRX) cycle to conserve battery power, as described in more detail elsewhere herein.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. In some aspects, a scheduling entity may use a downlink control channel communication to schedule a downlink data channel communication and/or an uplink data channel communication, as described in more detail elsewhere herein.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples may differ from what is described with regard to FIG. 1.

Figure 2:
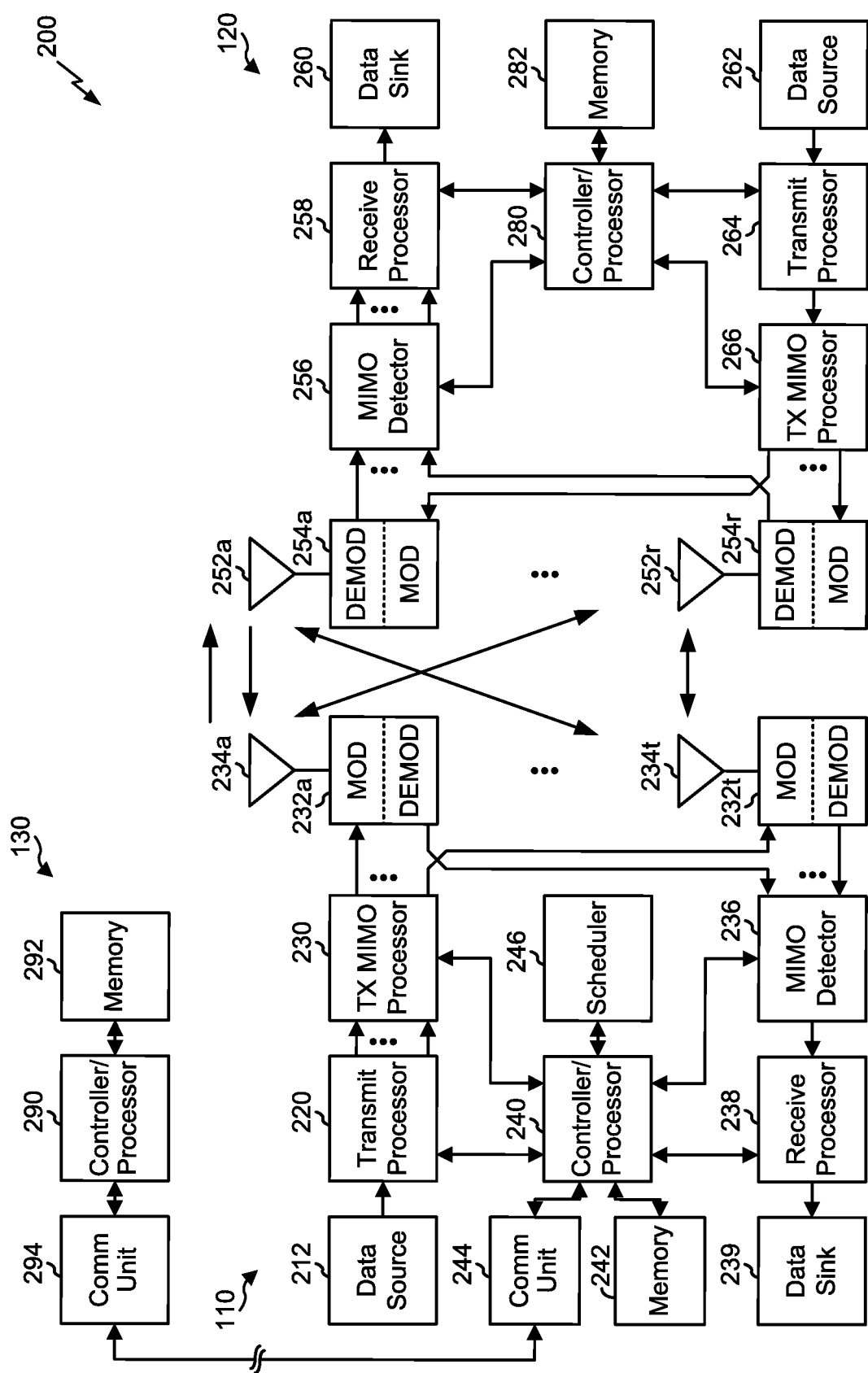
FIG. 2 is a diagram illustrating an example of a base station in communication with a user equipment (UE) in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with DRX operations with flexible scheduling of data communications, as described in more detail elsewhere herein. For example, controller/processor 240 of base station 110, controller/processor 280 of UE 120, and/or any other component(s) of FIG. 2 may perform or direct operations of, for example, method 900 of FIG. 9, method 1000 of FIG. 10, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

5G may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, 5G may utilize OFDM with a CP (herein referred to as cyclic prefix OFDM or CP-OFDM) and/or SC-FDM on the uplink, may utilize CP-OFDM on the downlink, and include support for half-duplex operation using TDD. In aspects, 5G may, for example, utilize CP-OFDM and/or discrete Fourier transform spread orthogonal frequency-division multiplexing (DFT-s-OFDM) on the uplink, may utilize CP-OFDM on the downlink and include support for half-duplex operation using TDD. 5G may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. 5G resource blocks may span 12 sub-carriers with a sub-carrier bandwidth of 75 kilohertz (kHz) over a 0.1 ms duration. Each radio frame may include 50 slots with a duration of 10 ms. Consequently, each slot may have a duration of 0.2 ms. Each slot may indicate a link direction (e.g., DL or UL) for data transmission and the link direction for each slot may be dynamically switched. Each slot may include DL/UL data as well as DL/UL control data.

Beamforming may be supported, and beam direction may be dynamically configured.

MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, 5G may support a different air interface, other than an OFDM-based interface. 5G networks may include entities such as central units or distributed units.

The RAN may include a central unit (CU) and distributed units (DUs). A 5G BS (e.g., gNB, 5G Node B, Node B, transmit receive point (TRP), access point (AP)) may correspond to one or multiple BSs. 5G cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some aspects, DCells may not transmit synchronization signals. In some aspects, DCells may transmit synchronization signals. 5G BSs may transmit downlink signals to UEs indicating the cell type. Based at least in part on the cell type indication, the UE may communicate with the 5G BS. For example, the UE may determine 5G BSs to consider for cell selection, access, handover, and/or measurement based at least in part on the indicated cell type.

Figure 3:
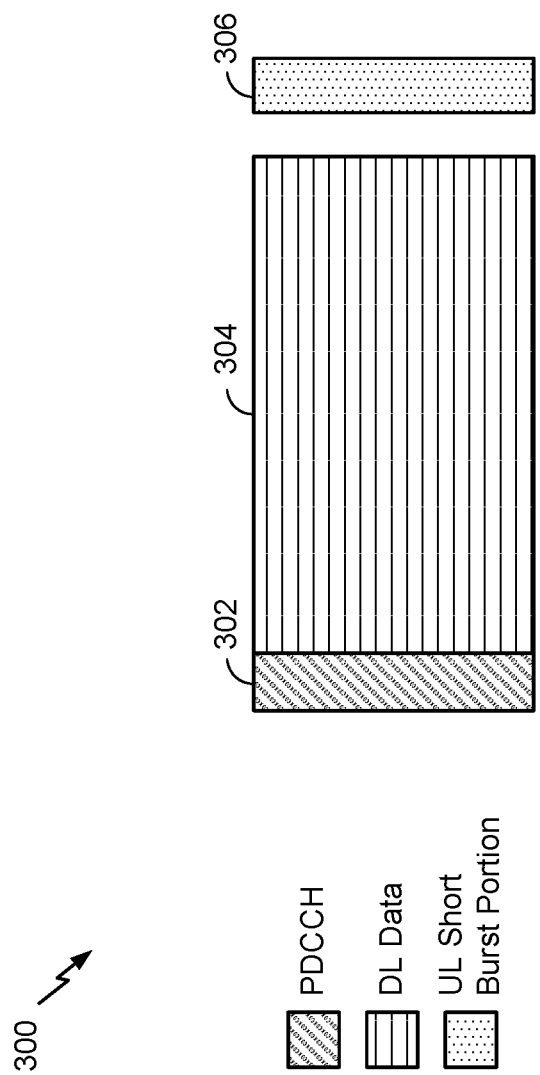
FIG. 3 is a diagram illustrating an example of a downlink (DL)-centric slot.

FIG. 3 is a diagram 300 showing an example of a DL-centric slot or wireless communication structure. The DL-centric slot may include a control portion 302. The control portion 302 may exist in the initial or beginning portion of the DL-centric slot. The control portion 302 may include various scheduling information and/or control information corresponding to various portions of the DL-centric slot. In some configurations, the control portion 302 may be a physical DL control channel (PDCCH), as indicated in FIG. 3.

The DL-centric slot may also include a DL data portion 304. The DL data portion 304 may sometimes be referred to as the payload of the DL-centric slot. The DL data portion 304 may include the communication resources utilized to communicate DL data from the scheduling entity (e.g., UE or BS) to the subordinate entity (e.g., UE). In some configurations, the DL data portion 304 may be a physical DL shared channel (PDSCH).

The DL-centric slot may also include a UL short burst portion 306. The UL short burst portion 306 may sometimes be referred to as a UL burst, a UL burst portion, a common UL burst, a short burst, a UL short burst, a common UL short burst, a common UL short burst portion, and/or various other suitable terms. In some aspects, the UL short burst portion 306 may include one or more reference signals. Additionally, or alternatively, the UL short burst portion 306 may include feedback information corresponding to various other portions of the DL-centric slot. For example, the UL short burst portion 306 may include feedback information corresponding to the control portion 302 and/or the data portion 304. Non-limiting examples of information that may be included in the UL short burst portion 306 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 306 may include additional or alternative information, such as information pertaining to random access channel (RACH) procedures, scheduling requests, and various other suitable types of information.

As illustrated in FIG. 3, the end of the DL data portion 304 may be separated in time from the beginning of the UL short burst portion 306. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 3 is provided merely as an example. Other examples may differ from what is described with regard to FIG. 3.

Figure 4:
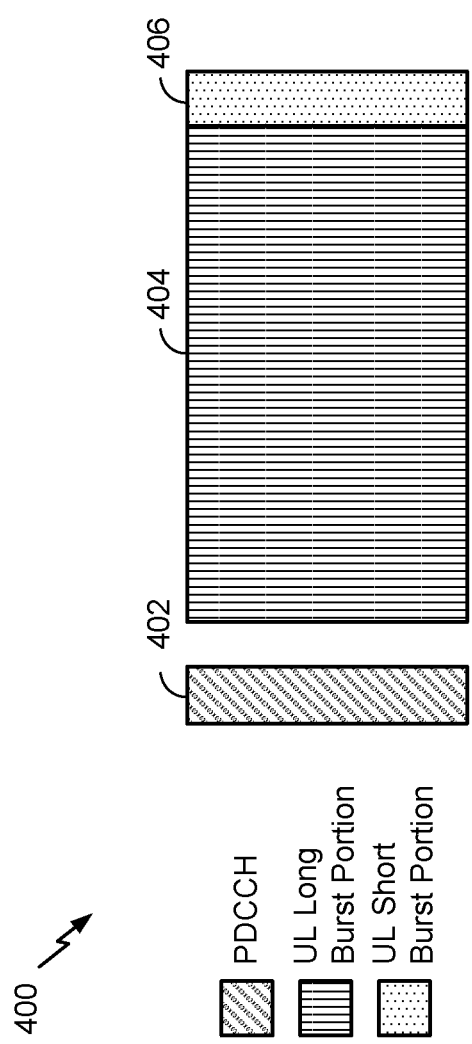
FIG. 4 is a diagram illustrating an example of an uplink (UL)-centric slot.

FIG. 4 is a diagram 400 showing an example of a UL-centric slot or wireless communication structure. The UL-centric slot may include a control portion 402. The control portion 402 may exist in the initial or beginning portion of the UL-centric slot. The control portion 402 in FIG. 4 may be similar to the control portion 302 described above with reference to FIG. 3. In some configurations, the control portion 402 may be a physical DL control channel (PDCCH).

The UL-centric slot may also include a UL long burst portion 404. The UL long burst portion 404 may sometimes be referred to as the payload of the UL-centric slot. The UL portion may refer to the communication resources utilized to communicate UL data from the subordinate entity (e.g., UE) to the scheduling entity (e.g., UE or BS).

As illustrated in FIG. 4, the end of the control portion 402 may be separated in time from the beginning of the UL long burst portion 404. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include a UL short burst portion 406. The UL short burst portion 406 in FIG. 4 may be similar to the UL short burst portion 306 described above with reference to FIG. 3, and may include any of the information described above in connection with FIG. 3. The foregoing is merely one example of a UL-centric wireless communication structure, and alternative structures having similar features may exist without necessarily deviating from the aspects described herein.

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 4 is provided merely as an example. Other examples may differ from what is described with regard to FIG. 4.

Figure 5:
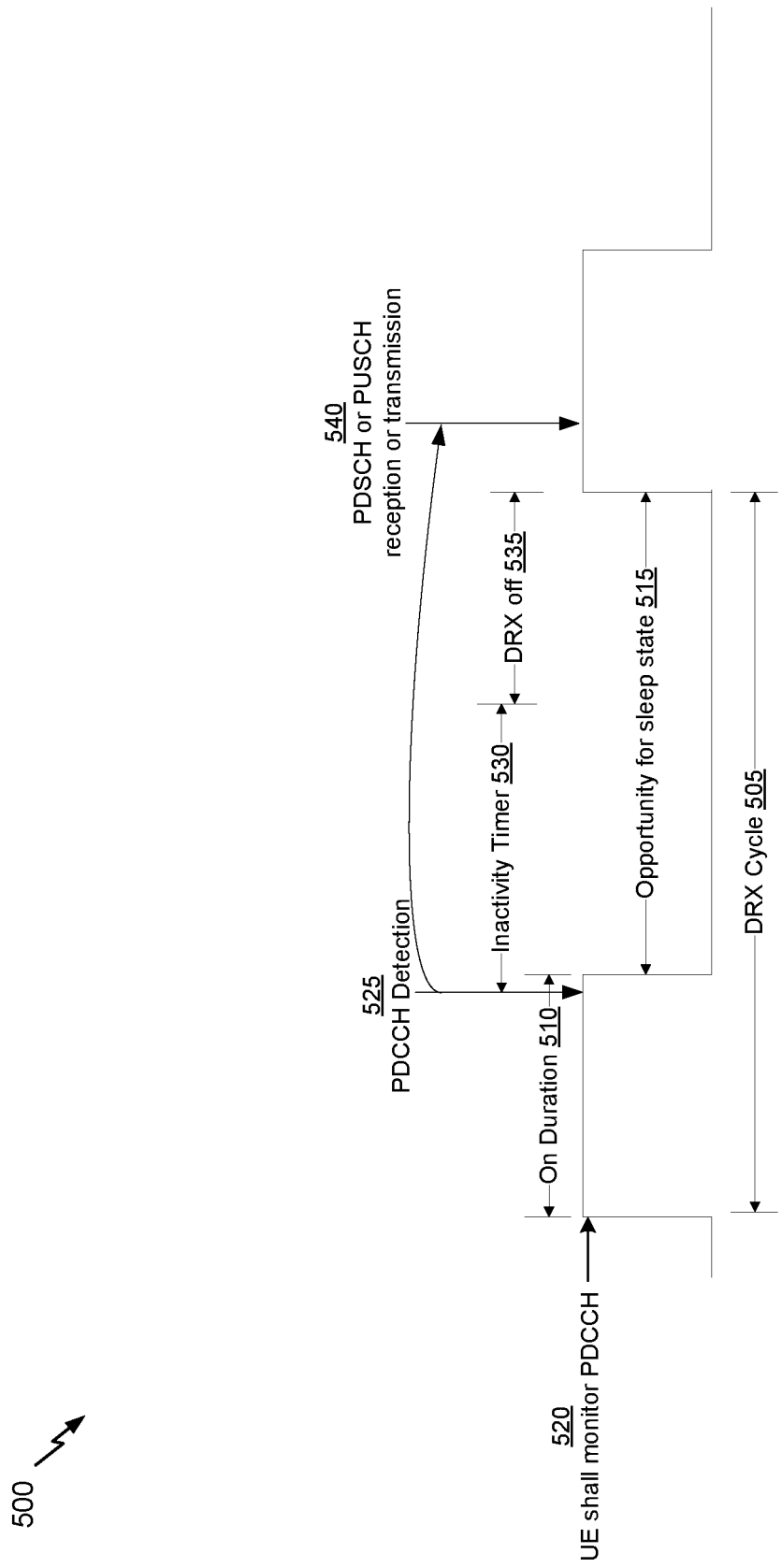
FIG. 5 is a diagram illustrating an example relating to DRX operations.

FIG. 5 is a diagram illustrating an example 500 relating to DRX operations.

As shown in FIG. 5, a DRX cycle 505 may include a DRX on duration 510 (e.g., during which the UE is awake or in an active state) and an opportunity to enter a DRX sleep state 515. During the DRX on duration 510, at 520, a UE (e.g., UE 120 and/or the like) may monitor a downlink control channel (e.g., the PDCCH). For example, the UE may monitor the PDCCH for downlink control information (DCI) pertaining to the UE. If the UE does not detect and/or successfully decode any PDCCH communications intended for the UE during the DRX on duration 510, then the UE may enter the sleep state 515 at the end of the DRX on duration 510, thereby conserving battery power and reducing UE power consumption. As shown, the DRX cycle 505 may repeat with a configured periodicity.

However, at 525, if the UE detects and/or successfully decodes a PDCCH communication intended for the UE, then the UE may remain in an active state (e.g., awake) for the duration of a DRX inactivity timer 530. The UE may start the DRX inactivity timer 530 at a time at which the PDCCH communication is received (e.g., in a transmission time interval (TTI) in which the PDCCH communication is received, such as a slot, a subframe, and/or the like). The UE may remain in the active state until the DRX inactivity timer 530 expires, at which time the UE may enter the sleep state 515 (e.g., DRX off), at 535. During the duration of the DRX inactivity timer 530, the UE may continue to monitor for PDCCH communications, may obtain data (e.g., on a PDSCH) scheduled by the PDCCH communication, may prepare and/or transmit an uplink communication (e.g., on the PUSCH) scheduled by the PDCCH communication, and/or the like. The UE may restart the DRX inactivity timer 530 after each detection of a PDCCH communication for the UE for an initial transmission (e.g., but not for a retransmission).

Thus, in the example shown in FIG. 5, the UE may be in an active state to perform operations associated with transmission and/or reception of data (e.g., on the PDSCH or the PUSCH) shortly after receiving a PDCCH communication that schedules such transmission and/or reception. In 4G/LTE, the timing between a PDCCH communication and a corresponding data communication (e.g., on the PDSCH or PUSCH) may be fixed. For example, in 4G/LTE, the UE may receive a PDSCH communication in the same TTI (e.g., subframe) as the PDCCH that schedules the PDSCH communication, and/or may transmit a PUSCH communication four TTIs (e.g., subframes) after the PDCCH that schedules the PUSCH communication.

However, in 5G, the timing between a PDCCH communication (also referred to herein as a downlink control channel communication) and a corresponding data communication may be flexibly configured, as described below in more detail in connection with FIGS. 6-8. For example, a timing between the PDCCH communication and reception of a corresponding PDSCH communication (also referred to herein as a downlink data communication) scheduled by the PDCCH communication may be configured as 0 slots (e.g., a same slot), 1 slot, 2 slots, 3 slots, 4 slots, 5 slots, 8 slots, 10 slots, 16 slots, 20 slots, 32 slots, and/or the like. Similarly, a timing between the PDCCH communication and transmission of a corresponding PUSCH communication (also referred to herein as an uplink data communication) scheduled by the PDCCH communication may be configured as 0 slots (e.g., a same slot), 1 slot, 2 slots, 3 slots, 4 slots, 5 slots, 6 slots, 7 slots, 8 slots, 10 slots, 16 slots, 20 slots, 32 slots, and/or the like. In this case, the UE may unnecessarily remain in an active state if the DRX inactivity timer 530 starts in the slot where the PDCCH communication is received and the corresponding data communication scheduled by the PDCCH does not occur before expiration of the DRX inactivity timer 530, at 540. This may waste battery power of the UE.

Some techniques and apparatuses described below in connection with FIGS. 6-12 permit a UE to start a DRX inactivity timer based at least in part on a data communication (e.g., in a slot in which a PDSCH communication and/or a PUSCH communication is scheduled), rather than starting the DRX inactivity timer in a slot in which a corresponding PDCCH communication is received. In this way, the UE may increase the duration of time that the UE is in a sleep state, especially when the data communication is scheduled to occur with a long delay after the PDCCH communication, thereby conserving battery power of the UE. Some of these techniques and apparatuses may be flexibly configured to conserve battery power of the UE depending on a flexible scheduling of data communications.

As indicated above, FIG. 5 is provided as an example. Other examples may differ from what is described with respect to FIG. 5.

Figure 6:
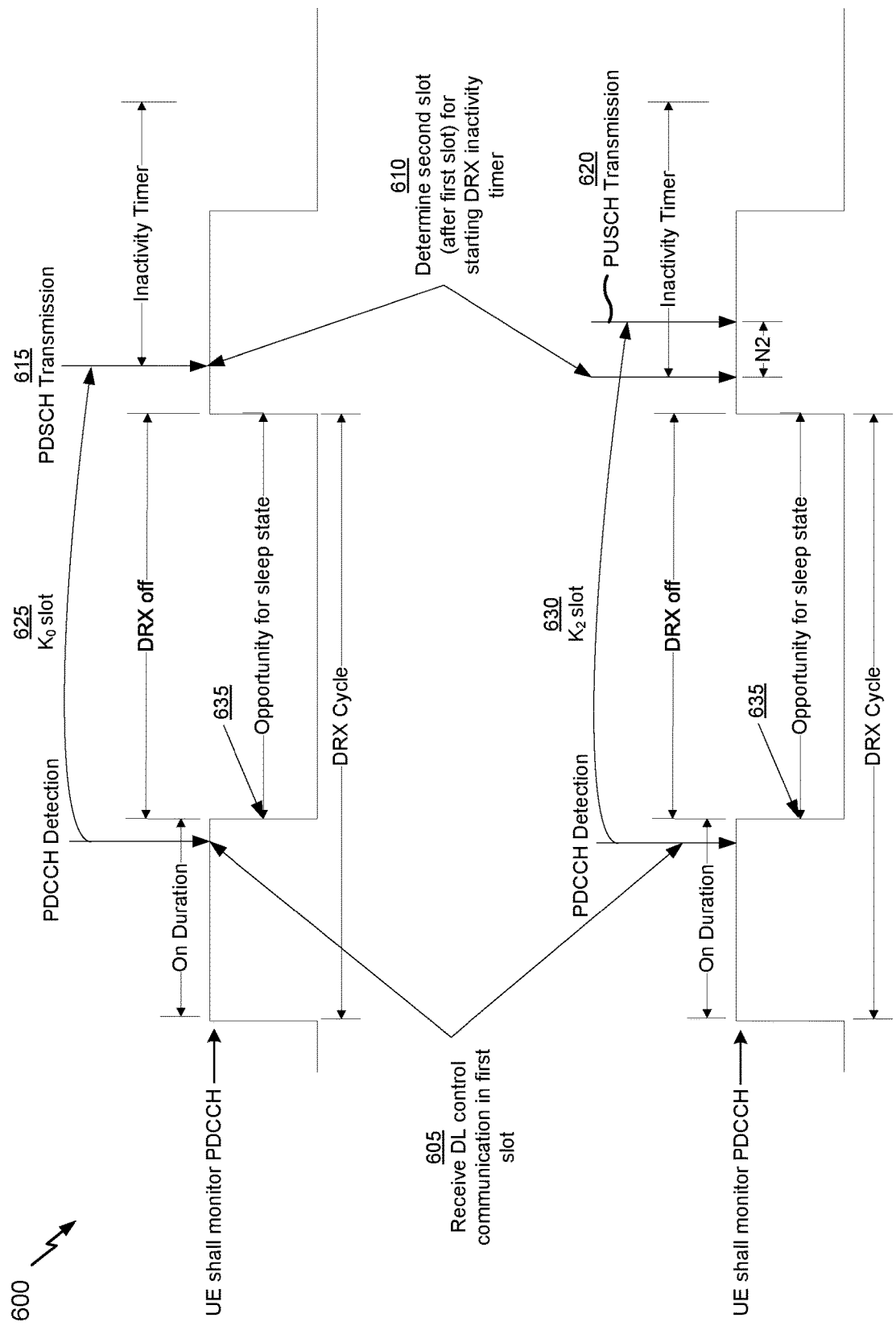
FIGS. 6-8 are diagrams illustrating examples relating to DRX operations with flexible scheduling of data communications.

FIG. 6 is a diagram illustrating another example 600 relating to DRX operations with flexible scheduling of data communications.

At 605, a UE (e.g., UE 120 and/or the like) may receive a downlink control channel communication in a first slot during a DRX on duration. The downlink control channel communication may be a PDCCH communication. In some aspects, the downlink control channel communication may be received in a control portion 302 and/or a control portion 402 of a slot, as described above in connection with FIGS. 3 and 4. Although FIGS. 3 and 4 show DL-centric and UL-centric slots, the downlink control channel communication may be received in another type of slot, such as a DL-only slot and/or the like. In some aspects, the slot may be configured in accordance with a 5G 3GPP communication standard, and a duration of a slot may be flexibly configured (e.g., based at least in part on a numerology associated with the slot). For example, the duration of the slot may be configured to 1 ms, 0.5 ms, 0.25 ms, 0.125 ms, 0.0625 ms, and/or the like.

At 610, the UE may determine a second slot for starting a DRX inactivity timer, and may start the DRX inactivity timer in the second slot. In some aspects, the second slot occurs after the first slot, as shown. In some aspects, the second slot may be determined based at least in part on a data channel communication scheduled by the downlink control channel communication (e.g., based at least in part on a slot in which the data channel communication is scheduled by the downlink control channel communication, a slot in which the data channel communication is transmitted, a slot in which the data channel communication is received, and/or the like). The data channel communication may include, for example, a downlink data channel communication (e.g., a PDSCH communication), an uplink data channel communication (e.g., a PUSCH communication), and/or the like.

At 615, in some aspects, the second slot may be determined based at least in part on a downlink data channel communication (e.g., a PDSCH communication) scheduled by the downlink control channel communication (e.g., a PDCCH communication). For example, the second slot may be the slot in which the downlink data channel communication is scheduled to be received. Alternatively, the second slot may occur a number of slots before a slot in which the downlink data channel communication is scheduled to be received (e.g., to allow the UE to prepare for reception of the downlink data channel communication). In some aspects, the number of slots may be hard coded in memory of the UE (e.g., according to a 3GPP specification). Additionally, or alternatively, the number of slots may be signaled by a base station in communication with the UE (e.g., during radio resource control (RRC) configuration, in DCI, and/or the like).

At 620, in some aspects, the second slot may be determined based at least in part on an uplink data channel communication (e.g., a PUSCH communication) scheduled by the downlink control channel communication. For example, the second slot may be the slot in which the uplink data channel communication is scheduled to be transmitted. Alternatively, the second slot may occur a number of slots before a slot in which the uplink data channel communication is scheduled to be transmitted (e.g., to allow the UE to prepare for transmission of the uplink data channel communication). In some aspects, the number of slots may be hard coded in memory of the UE (e.g., according to a 3GPP specification). Additionally, or alternatively, the number of slots may be signaled by a base station in communication with the UE (e.g., using a radio resource control (RRC) configuration message, in DCI, and/or the like).

In some aspects, the UE may determine the number of slots before the slot in which the uplink data channel communication is scheduled to be transmitted based at least in part on a processing time required to process the uplink data channel communication. The processing time may be, for example, a number of OFDM symbols required for processing the uplink data channel communication measured from an end of a downlink control channel communication, that includes an uplink grant for the uplink data channel communication, to an earliest possible start of transmission of the uplink data channel communication (e.g., which may be referred to as an N2 value in the 3GPP specification). As another example, the processing time may be a number of OFDM symbols required for processing the uplink data channel communication measured from an end of a downlink control channel communication, that includes an uplink grant for the uplink data channel communication, to an earliest possible start of transmission of the uplink data channel communication in a scenario where the UE multiplexes the uplink data channel communication with uplink control information (UCI), such as ACK/NACK feedback and/or the like (e.g., which may be referred to as an N2' value in the 3GPP specification). In some aspects, the UE may round up the processing time (e.g., indicated in a UE capability report) to correspond to a granularity of a slot, such that the number of slots corresponding to the processing time (e.g., in milliseconds) is greater than or equal to the processing time. In some aspects, the processing time may be zero.

Additionally, or alternatively, the UE may determine the second slot based at least in part on a timing value indicated in the downlink control channel communication (e.g., in DCI). For example, the timing value may be flexibly configured to adjust a timing between the downlink control channel communication and a corresponding data channel communication (e.g., on the PDSCH, the PUSCH, and/or the like).

At 625, in some aspects, the timing value may indicate a timing between the downlink control channel communication (e.g., a PDCCH communication) and reception of a downlink data channel communication (e.g., a PDSCH communication) scheduled by the downlink control channel communication (e.g., which may be referred to as a K0 value in the 3GPP specification).

At 630, in some aspects, the timing value may indicate a timing between the downlink control channel communication and transmission of an uplink data channel communication (e.g., a PUSCH communication) scheduled by the downlink control channel communication (e.g., which may be referred to as a K2 value in the 3GPP specification).

In some aspects, the timing value may indicate a timing as a number of slots. In this case, the UE may determine the second slot based at least in part on adding the indicated number of slots to the first slot in which the downlink control channel communication is received. For example, the second slot may occur the indicated number of slots after the first slot. Additionally, or alternatively, the UE may determine the second slot by adding the indicated number of slots to the first slot and subtracting an offset to account for processing time.

At 635, the UE may enter a sleep state for one or more slots (e.g., at least a portion of the slots) that occur between the first slot and the second slot. For example, the UE may enter the sleep state upon expiration of the DRX on duration, regardless of whether the DRX on duration expires at a time that would fall within the DRX inactivity timer if the DRX inactivity timer were to start upon reception of the downlink control channel communication. In this way, the UE may increase the amount of time that the UE is in a sleep state, thereby conserving power. In this case, a base station in communication with the UE may prevent scheduling or transmission of any communications to the UE after expiration of the DRX on duration during the sleep state (e.g., before the next successive DRX on duration), even if the UE would have been in an active state if a legacy DRX procedure were used where the DRX inactivity timer starts in the first slot.

In some aspects, the UE may enter the sleep state upon expiration of the DRX on duration based at least in part on a determination that the second slot occurs at least a threshold number of slots after the first slot (e.g., 4 or more slots, 8 or more slots, 10 or more slots, 16 or more slots, 20 or more slots, and/or the like). For example, if the data channel communication is to occur at least a threshold number of slots after a corresponding downlink control channel communication, then the UE may enter the sleep state upon expiration of the DRX on duration. Otherwise, the UE may remain in the active state after expiration of the DRX on duration (e.g., by starting the DRX inactivity timer in the first slot). In this way, the UE may remain in an active state to transmit and/or receive data if the data channel communication occurs a short period of time after the corresponding downlink control channel communication, or may enter the sleep state to conserve power if the data channel communication occurs a long period of time after the downlink control channel communication.

In some aspects, the UE may remain in an active state upon expiration of the DRX on duration during all slots that occur between the first slot and the second slot, as described in more detail below in connection with FIG. 8. In this way, a base station (e.g., base station 110 and/or the like) may configure the UE to remain in an active state to increase scheduling flexibility. In some aspects, the base station may indicate, to the UE, whether to enter the sleep state or remain in the active state upon expiration of the DRX on duration. In this way, the UE may conserve power during periods of low traffic activity for the UE, and may remain active during periods of high traffic activity for the UE, thereby improving performance.

As indicated above, FIG. 6 is provided as an example. Other examples may differ from what is described with respect to FIG. 6.

Figure 7:
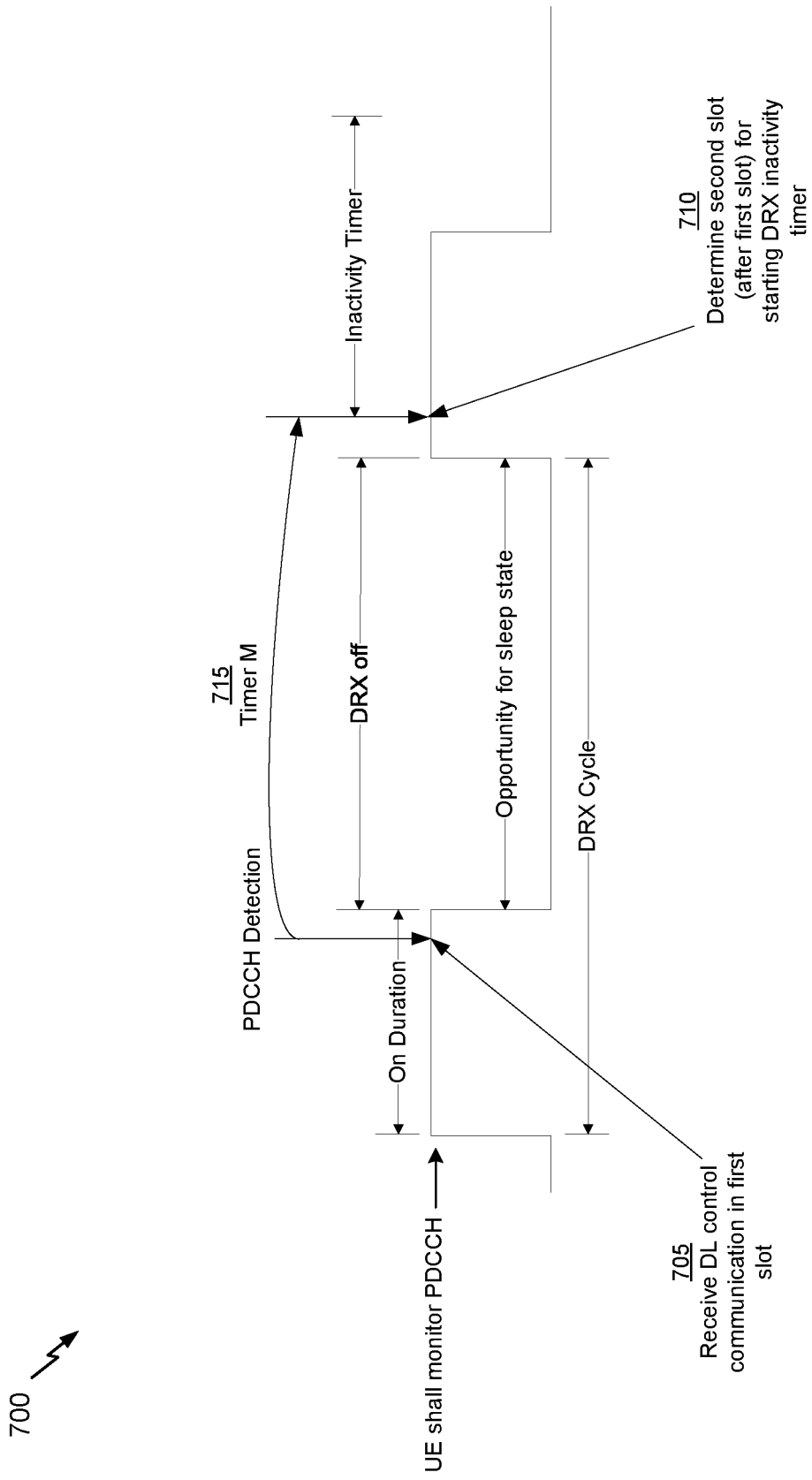

FIG. 7 illustrates another example 700 relating to DRX operations with flexible scheduling of data communications.

At 705, a UE (e.g., UE 120 and/or the like) may receive a downlink control channel communication in a first slot during a DRX on duration, as described above in connection with FIG. 6.

At 710, the UE may determine a second slot for starting a DRX inactivity timer, and may start the DRX inactivity timer in the second slot. In some aspects, the second slot occurs after the first slot, as shown.

At 715, in some aspects, the second slot is determined based at least in part on a preliminary timer that starts in the first slot (e.g., shown as timer M). This timer may be referred to herein as a delay timer, and may delay the start of the DRX inactivity timer until the second slot. For example, the UE may start the DRX inactivity timer in the second slot based at least in part on expiration of the delay timer in the second slot.

In some aspects, the UE may determine a duration of the timer (e.g., in milliseconds, a number of slots, and/or the like) based at least in part on a set of timing values indicated in a configuration message, such as an RRC configuration message and/or the like. The set of timing values may include, for example, a first set of timing values that indicate a timing between the downlink control channel communication (e.g., a PDCCH communication) and reception of a downlink data channel communication (e.g., a PDSCH communication) scheduled by the downlink control channel communication (e.g., a set of K0 timing values), a second set of timing values that indicate a timing between the downlink control channel communication and transmission of an uplink data channel communication (e.g., a PUSCH communication) scheduled by the downlink control channel communication (e.g., a set of K2 timing values), and/or the like. In some aspects, the configuration message may be received from a base station (e.g., base station 110 and/or the like). In this way, the UE may conserve processing resources by performing a single determination of the duration of the timer, rather than multiple determinations for different timing values indicated in DCI.

For example, the configuration message may indicate the first set of timing values and/or the second set of timing values as candidates to be used for communications between the UE and the base station (e.g., based at least in part on a capability exchange, a negotiation procedure, and/or the like). For a particular downlink control channel communication, the base station may indicate (e.g., in DCI) a timing value selected from the first set if the downlink control channel communication schedules a downlink data channel communication. Similarly, the base station may indicate (e.g., in DCI) a timing value selected from the second set if the downlink control channel communication schedules an uplink data channel communication.

In some aspects, the UE may select a minimum timing value from the first set of timing values as the duration of the delay timer (e.g., when the downlink control channel communication schedules a downlink data channel communication). Similarly, the UE may select a minimum timing value from the second set of timing values as the duration of the delay timer (e.g., when the downlink control channel communication schedules an uplink data channel communication). In this way, the UE may ensure that the UE is in an active state for a scheduled data channel communication, regardless of the timing value used for the scheduled data channel communication (e.g., the timing value indicated in DCI for the scheduled data channel communication). In some aspects, the UE may determine a duration of the delay timer based at least in part on a timing value indicated in DCI, in a similar manner as described above in connection with FIG. 6.

In some aspects, the UE may determine a duration of the delay timer based at least in part on an explicit indication in a configuration message (e.g., received from a base station), such as an RRC configuration message and/or the like. For example, the configuration message may explicitly indicate the duration of the delay timer to be used by the UE (e.g., using one or more bits in a bit field, of the configuration message, dedicated to indicating the duration of the delay timer). In some aspects, the configuration message may indicate a first delay timer duration to be used for downlink data channel communications and a second delay timer duration to be used for uplink data channel communications. In some aspects, the first delay timer duration may be different from the second delay timer duration. In this case, the UE may determine which delay timer duration to use based at least in part on whether the UE is scheduled for a downlink data channel communication or an uplink data channel communication. In some aspects, a common delay timer duration may be used for both downlink data channel communications and uplink data channel communications.

As described above in connection with FIG. 6, the UE may enter a sleep state for one or more slots (e.g., at least a portion of the slots) that occur between the first slot and the second slot. For example, the UE may enter the sleep state upon expiration of the DRX on duration, regardless of whether the DRX on duration expires at a time that would fall within the DRX inactivity timer if the DRX inactivity timer were to start upon reception of the downlink control channel communication. In this way, the UE may increase the amount of time that the UE is in a sleep state, thereby conserving power. Additionally, or alternatively, the UE may enter the sleep state upon expiration of the DRX on duration based at least in part on a determination that the second slot occurs at least a threshold number of slots after the first slot, in a similar manner as described above in connection with FIG. 6. Alternatively, the UE may remain in an active state upon expiration of the DRX on duration during all slots that occur between the first slot and the second slot, in a similar manner as described above in connection with FIG. 6 and as described in more detail below in connection with FIG. 8.

As indicated above, FIG. 7 is provided as an example. Other examples may differ from what is described with respect to FIG. 7.

Figure 8:
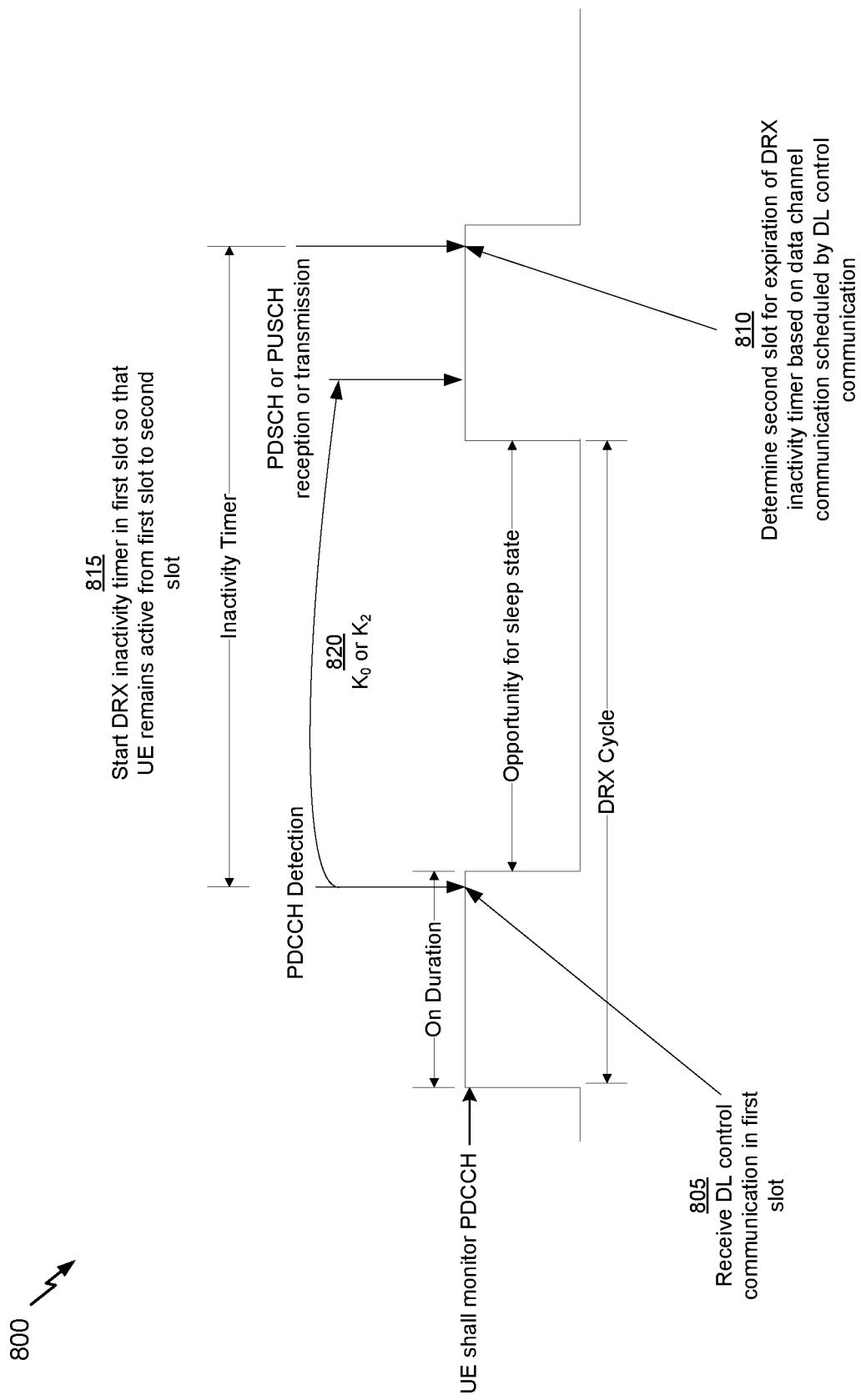

FIG. 8 is a diagram illustrating another example 800 relating to DRX operations with flexible scheduling of data communications.

At 805, a UE (e.g., UE 120 and/or the like) may receive a downlink control channel communication (e.g., a PDCCH communication) in a first slot during a DRX on duration, as described above in connection with FIGS. 6 and 7.

At 810, the UE may determine a second slot for expiration of a DRX inactivity timer.

In some aspects, the UE may determine the second slot based at least in part on a data channel communication (e.g., a PDSCH communication, a PUSCH communication, and/or the like) scheduled by the downlink control channel communication.

At 815, the UE may start the DRX inactivity timer in the first slot, wherein the UE is configured to remain in an active state from the first slot to the second slot.

At 820, in some aspects, the UE may determine the second slot and/or a duration of the DRX inactivity timer based at least in part on a timing value indicated in the downlink control channel communication. As described elsewhere herein, the timing value may indicate a timing between the downlink control channel communication and reception of a downlink data channel communication scheduled by the downlink control channel communication (e.g., a K0 timing value), a timing between the downlink control channel communication and transmission of an uplink data channel communication scheduled by the downlink control channel communication (e.g., a K2 timing value), and/or the like.

Additionally, or alternatively, the UE may determine the second slot and/or the duration of the DRX inactivity timer based at least in part on a preconfigured time duration. For example, the preconfigured time duration may indicate a time duration that the DRX inactivity timer is to run after a slot in which the data channel communication is scheduled to be transmitted or received. In some aspects, the UE may determine the second slot and/or the duration of the DRX inactivity timer based at least in part on the timing value and the preconfigured time duration. For example, the DRX inactivity timer may have a duration equal to the timing indicated by the timing value plus the preconfigured time duration. Additionally, or alternatively, the second slot may be determined by adding the timing value (e.g., a number of slots) and the preconfigured time duration (e.g., a preconfigured number of slots) to the first slot. In some aspects, the preconfigured time duration may be a duration of a legacy DRX inactivity timer (e.g., according to a 4G/LTE 3GPP specification). Thus, the duration of the legacy DRX inactivity timer may be extended by a duration indicated by a timing value indicated in the downlink control channel communication.

In some aspects, the UE may remain in an active state upon expiration of the DRX on duration during all slots between the first slot and the second slot (and/or for some preconfigured time duration after the second slot), due to the DRX inactivity timer starting in the first slot and extending past the second slot. In this way, a base station (e.g., base station 110 and/or the like) may configure the UE to remain in an active state to increase scheduling flexibility. In some aspects, the base station may indicate, to the UE, whether to enter the sleep state or remain in the active state upon expiration of the DRX on duration. Additionally, or alternatively, the base station may cancel a particular scheduled sleep state of a DRX cycle for the UE by using a particular timing value (e.g., a large timing value). In this way, the UE may conserve power during periods of low traffic activity for the UE, and may remain active during periods of high traffic activity for the UE, thereby improving performance.

As indicated above, FIG. 8 is provided as an example. Other examples may differ from what is described with respect to FIG. 8.

Figure 9:
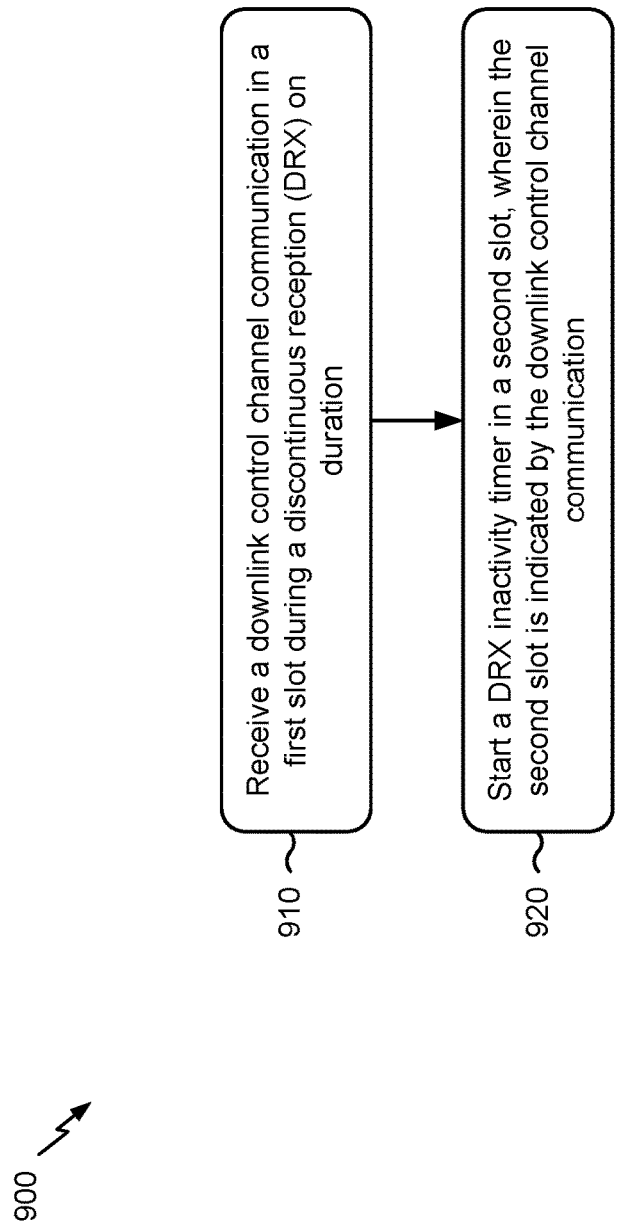
FIGS. 9-10 are flow charts of example methods of wireless communication.

FIG. 9 is a flow chart of a method 900 of wireless communication. The method may be performed by a UE (e.g., the UE 120 of FIG. 1, the UE described in connection with one or more of FIGS. 5-8, the apparatus 1102/1102' of FIG. 11 and/or FIG. 12, and/or the like).

At 910, the UE may receive a downlink control channel communication in a first slot during a discontinuous reception (DRX) on duration. For example, the UE (e.g., using antenna 252, DEMOD 254, MIMO detector 256, receive processor 258, controller/processor 280, and/or the like) may receive a downlink control channel communication in a first slot during a DRX on duration, as described above in connection with FIGS. 6-7.

At 920, the UE may start a DRX inactivity timer in a second slot, wherein the second slot is indicated by the downlink control channel communication. For example, the UE (e.g., using controller/processor 280 and/or the like) may start the DRX inactivity timer in the second slot, as described above in connection with FIGS. 6-7. In some aspects, the second slot is indicated by the downlink control channel communication. In some aspects, the second slot occurs after the first slot.

Method 900 may include additional aspects, such as any single aspect or any combination of aspects described below and/or in connection with one or more other processes described elsewhere herein.

In some aspects, the second slot is determined based at least in part on a downlink data channel communication scheduled by the downlink control channel communication. In some aspects, the second slot is a slot in which the downlink data channel communication is scheduled to be received. In some aspects, the second slot is determined based at least in part on an uplink data channel communication scheduled by the downlink control channel communication. In some aspects, the second slot occurs a number of slots before a slot in which the uplink data channel communication is scheduled. In some aspects, the number of slots is determined based at least in part on a processing time required to process the uplink data channel communication.

In some aspects, the second slot is determined based at least in part on a timing value indicated in the downlink control channel communication, wherein the timing value indicates at least one of: a timing between the downlink control channel communication and reception of a downlink data channel communication scheduled by the downlink control channel communication, a timing between the downlink control channel communication and transmission of an uplink data channel communication scheduled by the downlink control channel communication, or some combination thereof.

In some aspects, the second slot is determined based at least in part on a preliminary timer that starts in the first slot. In some aspects, the DRX inactivity timer is started in the second slot based at least in part on expiration of the timer in the second slot. In some aspects, a duration of the timer is determined based at least in part on a set of timing values indicated in a configuration message, wherein the set of timing values includes at least one of: a first set of timing values that indicate a timing between the downlink control channel communication and reception of a downlink data channel communication scheduled by the downlink control channel communication, a second set of timing values that indicate a timing between the downlink control channel communication and transmission of an uplink data channel communication scheduled by the downlink control channel communication, or some combination thereof. In some aspects, the duration of the timer is selected as a minimum timing value from the first set of timing values when the downlink control channel communication schedules the downlink data channel communication. In some aspects, the duration of the timer is selected as a minimum timing value from the second set of timing values when the downlink control channel communication schedules the uplink data channel communication.

In some aspects, a duration of the timer is explicitly indicated in a configuration message. In some aspects, a duration of the timer is indicated in a radio resource control (RRC) configuration message.

In some aspects, the UE is configured to enter a sleep state for at least a portion of slots between the first slot and the second slot. In some aspects, the UE is configured to enter the sleep state upon expiration of the DRX on duration. In some aspects, the UE is configured to remain in an active state upon expiration of the DRX on duration during all slots between the first slot and the second slot.

Although FIG. 9 shows example blocks of a method of wireless communication, in some aspects, the method may include additional blocks, fewer blocks, different blocks, or differently arranged blocks than those shown in FIG. 9. Additionally, or alternatively, two or more blocks shown in FIG. 9 may be performed in parallel.

Figure 10:
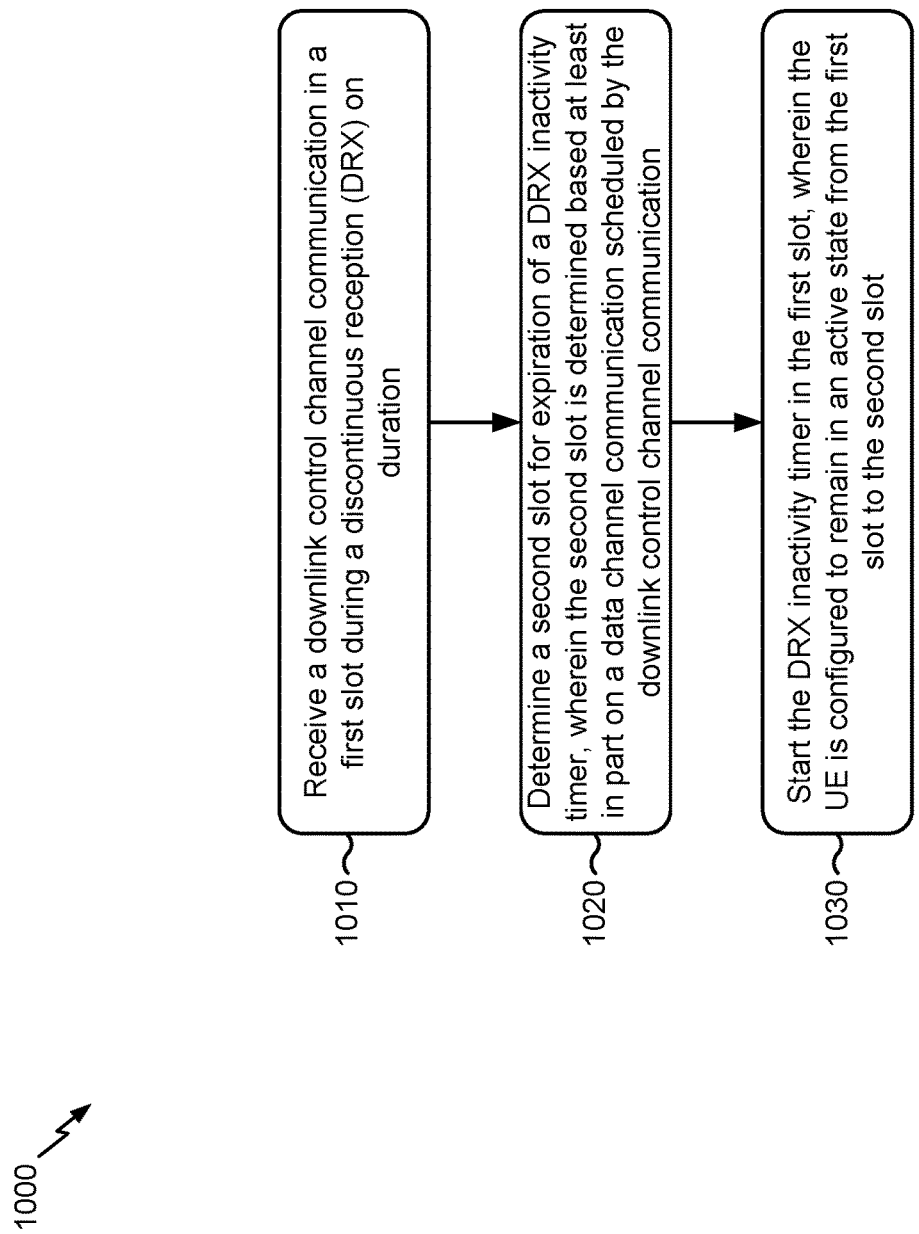

FIG. 10 is a flow chart of a method 1000 of wireless communication. The method may be performed by a UE (e.g., the UE 120 of FIG. 1, the UE described in connection with one or more of FIGS. 5-8, the apparatus 1102/1102' of FIG. 11 and/or FIG. 12, and/or the like).

At 1010, the UE may receive a downlink control channel communication in a first slot during a discontinuous reception (DRX) on duration. For example, the UE (e.g., using antenna 252, DEMOD 254, MIMO detector 256, receive processor 258, controller/processor 280, and/or the like) may receive a downlink control channel communication in a first slot during a DRX on duration, as described above in connection with FIG. 8.

At 1020, the UE may determine a second slot for expiration of a DRX inactivity timer, wherein the second slot is determined based at least in part on a data channel communication scheduled by the downlink control channel communication. For example, the UE (e.g., using controller/processor 280 and/or the like) may determine a second slot for expiration of a DRX inactivity timer, as described above in connection with FIG. 8. In some aspects, the second slot is determined based at least in part on a data channel communication scheduled by the downlink control channel communication.

At 1030, the UE may start the DRX inactivity timer in the first slot, wherein the UE is configured to remain in an active state from the first slot to the second slot. For example, the UE (e.g., using controller/processor 280 and/or the like) may start the DRX inactivity timer in the first slot, as described above in connection with FIG. 8. In some aspects, the UE is configured to remain in an active state from the first slot to the second slot.

Method 1000 may include additional aspects, such as any single aspect or any combination of aspects described below and/or in connection with one or more other processes described elsewhere herein.

In some aspects, a duration of the DRX inactivity timer is determined based at least in part on a timing value indicated in the downlink control channel communication. In some aspects, the timing value indicates at least one of: a timing between the downlink control channel communication and reception of a downlink data channel communication scheduled by the downlink control channel communication, a timing between the downlink control channel communication and transmission of an uplink data channel communication scheduled by the downlink control channel communication, or some combination thereof.

In some aspects, the duration of the DRX inactivity timer is further determined based at least in part on a preconfigured time duration. In some aspects, the preconfigured time duration indicates a duration of time that the DRX inactivity timer is to run after a slot in which the data channel communication is scheduled to be transmitted or received. In some aspects, the duration of the DRX inactivity timer includes a timing indicated by the timing value and the preconfigured time duration.

Although FIG. 10 shows example blocks of a method of wireless communication, in some aspects, the method may include additional blocks, fewer blocks, different blocks, or differently arranged blocks than those shown in FIG. 10. Additionally, or alternatively, two or more blocks shown in FIG. 10 may be performed in parallel.

Figure 11:
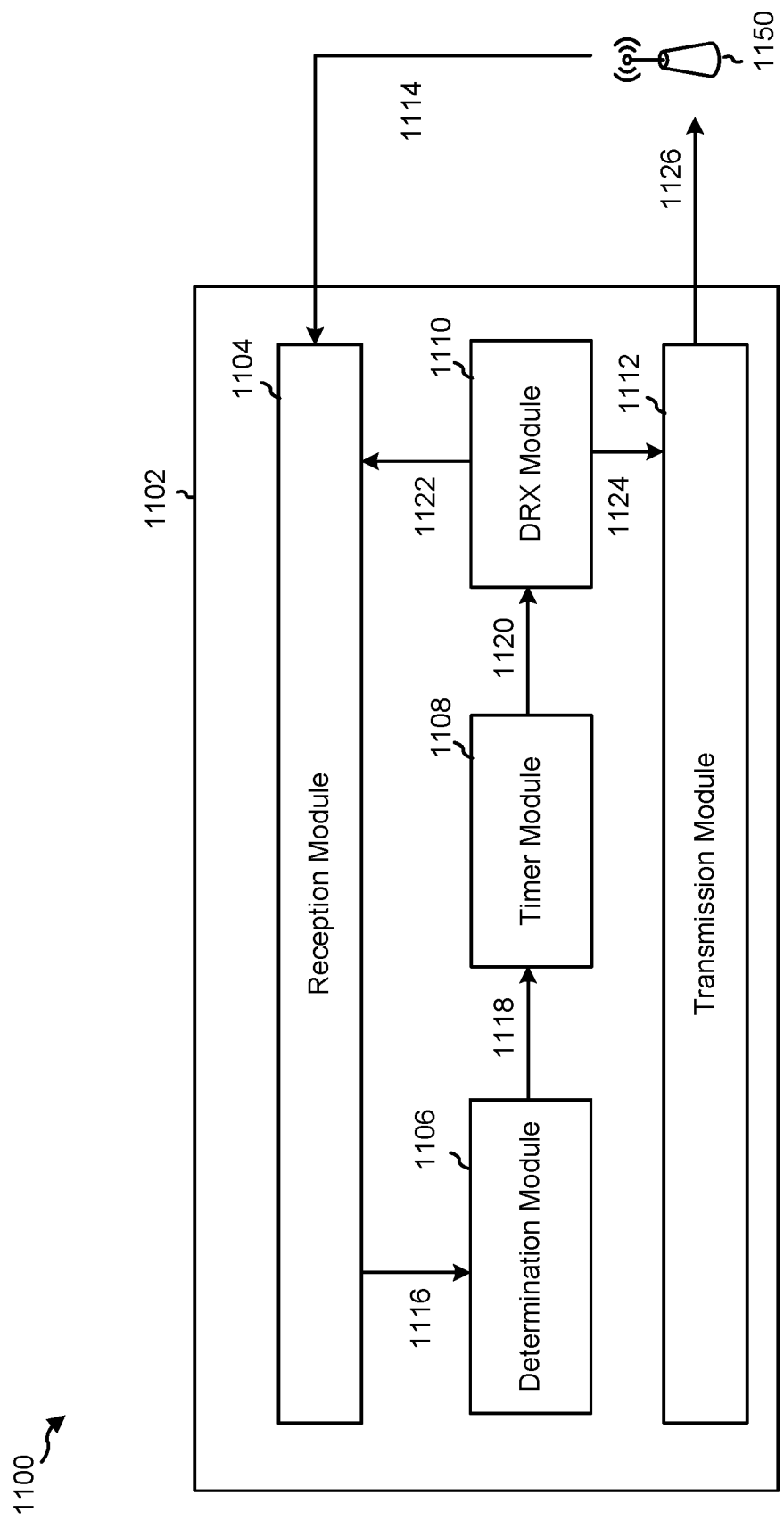
FIG. 11 is a conceptual data flow diagram illustrating the data flow between different modules/means/components in an example apparatus.

FIG. 11 is a conceptual data flow diagram 1100 illustrating the data flow between different modules/means/components in an example apparatus 1102. The apparatus 1102 may be a UE. In some aspects, the apparatus 1102 includes a reception module 1104, a determination module 1106, a timer module 1108, a DRX module 1110, a transmission module 1112, and/or the like.

The reception module 1104 may receive, as data 1114 from a base station 1150, a downlink control channel communication in a first slot during a DRX on duration. The determination module 1106 may determine a second slot for starting a DRX inactivity timer and/or a second slot for expiration of a DRX inactivity timer. In some aspects, the determination module 1106 may determine the second slot based at least in part on data 1116 received from the reception module 1104, such as information that identifies the first slot, information included in the downlink control channel communication, and/or the like. The determination module 1106 may provide information that identifies the second slot to the timer module 1108 as data 1118.

The timer module 1108 may start a DRX inactivity timer based at least in part on the second slot. For example, the timer module 1108 may start the DRX inactivity timer in the second slot, may start the DRX inactivity timer in the first slot such that the DRX inactivity timer is scheduled to expire in the second slot, and/or the like. The timer module 1108 may provide information regarding starting of the DRX inactivity timer, expiration of the DRX inactivity timer, and/or other information to be used to control whether the apparatus 1102 is in an active state or a sleep state to the DRX module 1110 as data 1120. The DRX module 1110 may control whether the apparatus 1102 is in an active state or a sleep state, such as by sending instructions to activate or deactivate one or more components of apparatus 1102 (e.g., an instruction 1122 to activate and/or deactivate the reception module 1104, an instruction 1124 to activate and/or deactivate the transmission module 1112, and/or the like). In some aspects, if the apparatus 1102 is scheduled to receive data in a downlink data channel communication, such data may be received from the base station 1150 as data 1114. Similarly, if the apparatus 1102 is scheduled to transmit data in an uplink data channel communication, such data may be transmitted to the base station 1150 as data 1126.

The apparatus may include additional modules that perform each of the blocks of the algorithm in the aforementioned method 900 of FIG. 9, method 1000 of FIG. 10, and/or the like. As such, each block in the aforementioned method 900 of FIG. 9, method 1000 of FIG. 10, and/or the like may be performed by a module, and the apparatus may include one or more of those modules. The one or more modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 11 are provided as an example. In practice, there may be additional modules, fewer modules, different modules, or differently arranged modules than those shown in FIG. 11. Furthermore, two or more modules shown in FIG. 11 may be implemented within a single module, or a single module shown in FIG. 11 may be implemented as multiple, distributed modules. Additionally, or alternatively, a set of modules (e.g., one or more modules) shown in FIG. 11 may perform one or more functions described as being performed by another set of modules shown in FIG. 11.

Figure 12:
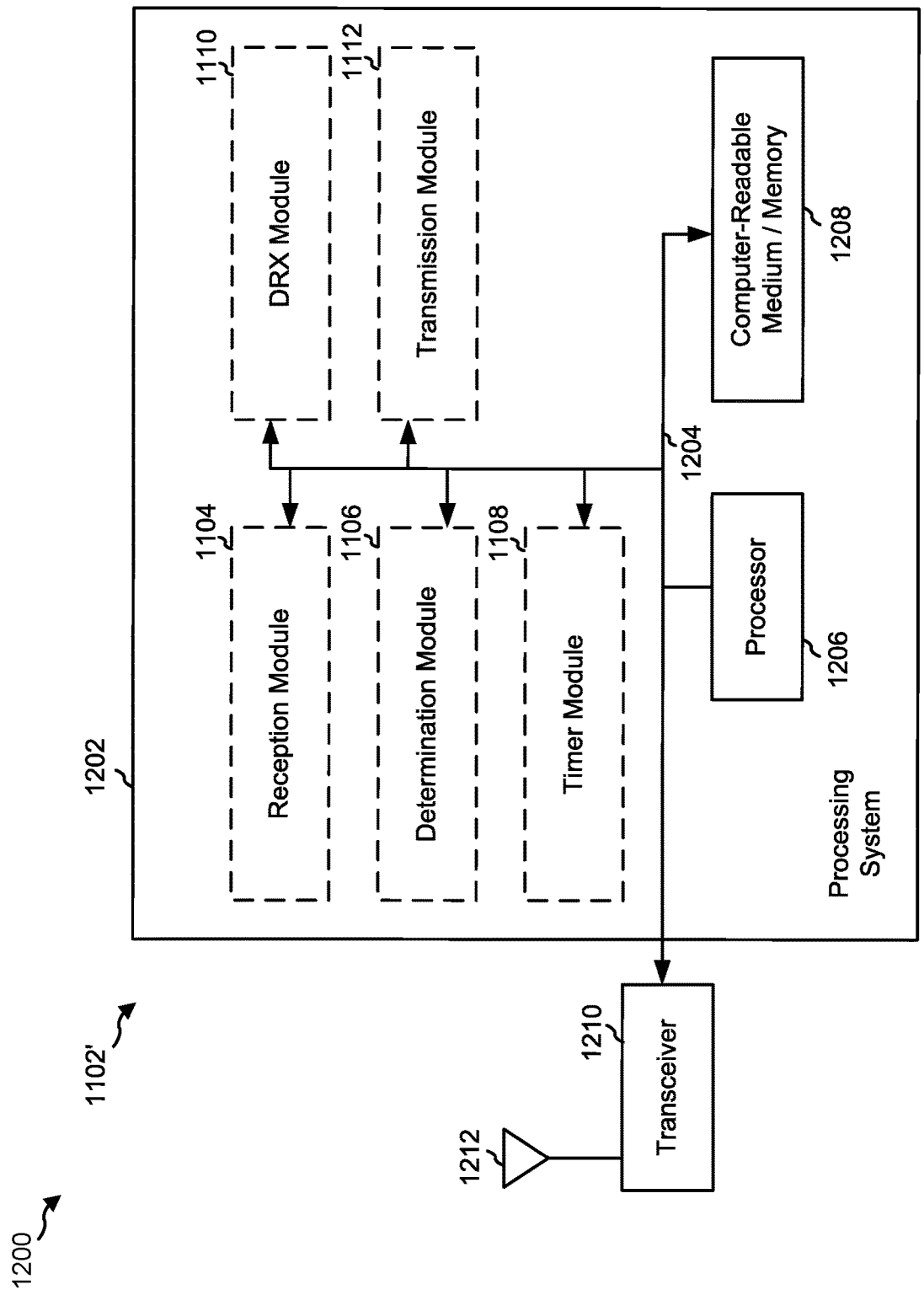
FIG. 12 is a diagram illustrating an example of a hardware implementation for an apparatus employing a processing system.

FIG. 12 is a diagram 1200 illustrating an example of a hardware implementation for an apparatus 1102' employing a processing system 1202. The apparatus 1102' may be a UE.

The processing system 1202 may be implemented with a bus architecture, represented generally by the bus 1204. The bus 1204 may include any number of interconnecting buses and bridges depending on the specific application of the processing system 1202 and the overall design constraints. The bus 1204 links together various circuits including one or more processors and/or hardware modules, represented by the processor 1206, the modules 1104, 1106, 1108, 1110, and/or 1112, and the computer-readable medium/memory 1208. The bus 1204 may also link various other circuits such as timing sources, peripherals, voltage regulators, and power management circuits, which are well known in the art, and therefore will not be described any further.

The processing system 1202 may be coupled to a transceiver 1210. The transceiver 1210 is coupled to one or more antennas 1212. The transceiver 1210 provides a means for communicating with various other apparatuses over a transmission medium. The transceiver 1210 receives a signal from the one or more antennas 1212, extracts information from the received signal, and provides the extracted information to the processing system 1202, specifically the reception module 1104. In addition, the transceiver 1210 receives information from the processing system 1202, specifically the transmission module 1112, and based at least in part on the received information, generates a signal to be applied to the one or more antennas 1212. The processing system 1202 includes a processor 1206 coupled to a computer-readable medium/memory 1208. The processor 1206 is responsible for general processing, including the execution of software stored on the computer-readable medium/memory 1208. The software, when executed by the processor 1206, causes the processing system 1202 to perform the various functions described supra for any particular apparatus. The computer-readable medium/memory 1208 may also be used for storing data that is manipulated by the processor 1206 when executing software. The processing system further includes at least one of the modules 1104, 1106, 1108, 1110, and/or 1112. The modules may be software modules running in the processor 1206, resident/stored in the computer readable medium/memory 1208, one or more hardware modules coupled to the processor 1206, or some combination thereof. The processing system 1202 may be a component of the UE 120 and may include the memory 282 and/or at least one of the TX MIMO processor 266, the RX processor 258, and/or the controller/processor 280.

In some aspects, the apparatus 1102/1102' for wireless communication includes means for receiving a downlink control channel communication in a first slot during a DRX on duration; means for starting a DRX inactivity timer in a second slot, wherein the second slot is indicated by the downlink control channel communication; and/or the like. Additionally, or alternatively, the apparatus 1102/1102' for wireless communication includes means for receiving a downlink control channel communication in a first slot during a DRX on duration; means for determining a second slot for expiration of a DRX inactivity timer, wherein the second slot is determined based at least in part on a data channel communication scheduled by the downlink control channel communication; means for starting the DRX inactivity timer in the first slot, wherein the UE is configured to remain in an active state from the first slot to the second slot; and/or the like. The aforementioned means may be one or more of the aforementioned modules of the apparatus 1102 and/or the processing system 1202 of the apparatus 1102' configured to perform the functions recited by the aforementioned means. As described supra, the processing system 1202 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform the functions recited by the aforementioned means.

FIG. 12 is provided as an example. Other examples may differ from what is described in connection with FIG. 12.

It should be understood that the specific order or hierarchy of blocks in the processes/flow charts disclosed is an illustration of example approaches. Based upon design preferences, it should be understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a user equipment (UE), comprising:
    receiving a downlink control channel communication in a first slot during a discontinuous reception (DRX) on duration;
    determining a second slot based at least in part on a data channel communication scheduled by the downlink control channel communication; and
    starting a DRX inactivity timer in the second slot.

2. The method of claim 1, wherein determining the second slot based at least in part on the data channel communication comprises:
    determining the second slot based at least in part on a downlink data channel communication scheduled by the downlink control channel communication.

3. The method of claim 2, wherein the second slot is a slot in which the downlink data channel communication is scheduled.

4. The method of claim 1, wherein determining the second slot based at least in part on the data channel communication comprises:
    determining the second slot based at least in part on an uplink data channel communication scheduled by the downlink control channel communication.

5. The method of claim 4, wherein the second slot occurs a number of slots before a slot in which the uplink data channel communication is scheduled.

6. The method of claim 5, wherein the number of slots is determined based at least in part on a processing time required to process the uplink data channel communication.

7. The method of claim 1, wherein the second slot is further determined based at least in part on a timing value indicated in the downlink control channel communication, wherein the timing value indicates at least one of:
    a timing between the downlink control channel communication and reception of a downlink data channel communication scheduled by the downlink control channel communication,
    a timing between the downlink control channel communication and transmission of an uplink data channel communication scheduled by the downlink control channel communication, or
    a combination thereof.

8. The method of claim 1, wherein the second slot is further determined based at least in part on a preliminary timer that starts in the first slot.

9. The method of claim 8, wherein the DRX inactivity timer is started in the second slot based at least in part on expiration of the preliminary timer in the second slot.

10. The method of claim 8, wherein a duration of the preliminary timer is determined based at least in part on a set of timing values indicated in a configuration message, wherein the set of timing values includes at least one of:
    a first set of timing values that indicate a timing between the downlink control channel communication and reception of a downlink data channel communication scheduled by the downlink control channel communication,
    a second set of timing values that indicate a timing between the downlink control channel communication and transmission of an uplink data channel communication scheduled by the downlink control channel communication, or
    a combination thereof.

11. The method of claim 10, wherein the duration of the preliminary timer is selected as a minimum timing value from the first set of timing values when the downlink control channel communication schedules the downlink data channel communication.

12. The method of claim 10, wherein the duration of the preliminary timer is selected as a minimum timing value from the second set of timing values when the downlink control channel communication schedules the uplink data channel communication.

13. The method of claim 8, wherein a duration of the preliminary timer is explicitly indicated in a configuration message.

14. The method of claim 8, wherein a duration of the preliminary timer is indicated in a radio resource control (RRC) configuration message.

15. The method of claim 1, wherein the UE is configured to enter a sleep state for at least a portion of slots between the first slot and the second slot.

16. The method of claim 15, wherein the UE is configured to enter the sleep state upon expiration of the DRX on duration.

17. The method of claim 1, wherein the UE is configured to remain in an active state upon expiration of the DRX on duration during all slots between the first slot and the second slot.

18. A method of wireless communication performed by a user equipment (UE), comprising:
receiving a downlink control channel communication in a first slot during a discontinuous reception (DRX) on duration;
determining a second slot for expiration of a DRX inactivity timer,
wherein the second slot is determined based at least in part on a data channel communication scheduled by the downlink control channel communication, and
wherein a duration of the DRX inactivity timer is determined based at least in part on a timing value indicated in the downlink control channel communication; and
starting the DRX inactivity timer in the first slot,
wherein the UE is configured to remain in an active state from the first slot to the second slot.

19. The method of claim 18, wherein the timing value indicates at least one of:
a timing between the downlink control channel communication and reception of a downlink data channel communication scheduled by the downlink control channel communication,
a timing between the downlink control channel communication and transmission of an uplink data channel communication scheduled by the downlink control channel communication, or
some combination thereof.

20. The method of claim 18, wherein the duration of the DRX inactivity timer is further determined based at least in part on a preconfigured time duration.

21. The method of claim 20, wherein the preconfigured time duration indicates a time duration that the DRX inactivity timer is to run after a slot in which the data channel communication is scheduled to be transmitted or received.

22. The method of claim 20, wherein the duration of the DRX inactivity timer includes a timing indicated by the timing value and the preconfigured time duration.

23. The method of claim 18, wherein the second slot is further determined based on a quantity of slots, associated with the timing value, and a preconfigured quantity of slots associated with a preconfigured time duration.

24. A user equipment (UE) for wireless communication, comprising:
memory; and
one or more processors operatively coupled to the memory, the memory and the one or more processors configured to:
receive a downlink control channel communication in a first slot during a discontinuous reception (DRX) on duration;
determine a second slot based at least in part on a data channel communication scheduled by the downlink control channel communication; and
start a DRX inactivity timer in the second slot.

25. The UE of claim 24, wherein the data channel communication is a downlink data channel communication or an uplink data channel communication scheduled by the downlink control channel communication.

26. The UE of claim 24, wherein the second slot is determined based at least in part on a preliminary timer that starts in the first slot and expires in the second slot.

27. The UE of claim 24, wherein the UE is configured to enter a sleep state for at least a portion of slots between the first slot and the second slot.

28. A user equipment (UE) for wireless communication, comprising:
memory; and
one or more processors operatively coupled to the memory, the memory and the one or more processors configured to:
receive a downlink control channel communication in a first slot during a discontinuous reception (DRX) on duration;
determine a second slot for expiration of a DRX inactivity timer,
wherein the second slot is determined based at least in part on a data channel communication scheduled by the downlink control channel communication, and
wherein a duration of the DRX inactivity timer is determined based at least in part on a timing value indicated in the downlink control channel communication; and
start the DRX inactivity timer in the first slot, wherein the UE is configured to remain in an active state from the first slot to the second slot.

29. The UE of claim 28, wherein the timing value indicates at least one of:
a timing between the downlink control channel communication and reception of a downlink data channel communication scheduled by the downlink control channel communication,
a timing between the downlink control channel communication and transmission of an uplink data channel communication scheduled by the downlink control channel communication, or
some combination thereof.

30. The UE of claim 28, wherein the second slot is further determined based on a quantity of slots, associated with the timing value, and a preconfigured quantity of slots associated with a preconfigured time duration.

* * * * *